United States Patent Office 3,594,379
Patented July 20, 1971

3,594,379
2,3-DIHYDROIMIDAZO[1,2-c]QUINAZOLINES
Goetz E. Hardtmann, Florham Park, and Hans Ott, Convent Station, N.J., assignors to Sandoz-Warner, Inc., Hanover, N.J.
No Drawing. Filed Sept. 16, 1968, Ser. No. 760,076
Int. Cl. C07d 57/12
U.S. Cl. 260—256.4                    16 Claims

ABSTRACT OF THE DISCLOSURE

The invention discloses 5-oxy-substituted-2,3-dihydroimidazo[1,2-c]quinazolines which are pharcameutically active and useful as hypotensive agents and as coronary dilators. Also disclosed are processes involved in preparation of said 2,3-dihydroimidazo[1,2-c]quinazolines employing intermediates which are 5-chloro-2,3-dihydroimidazo[1,2-c]quinazolines and 2-chloro-4-ethyleniminoquinazolines.

---

The present invention relates to 2,3-dihydroimidazo-[1,2-c]quinazolines having at the 5-position a substituent comprising carbon and hydrogen and joined to the imidazo[1,2-c]quinazoline by an oxygen atom of said substituent, and to pharmaceutical compositions incorporating said imidazo[1,2-c]quinazolines. The invention also relates to preparation of said imidazo[1,2-c]quinazolines from intermediates which are 5-chloro-2,3-dihydroimidazo[1,2-c]quinazolines which in turn may be obtained from intermediates which are 2-chloro-4-ethyleniminoquinazolines. The invention also relates to novel process for preparing certain intermediates useful in preparation of the compounds of the invention.

An object of the present invention is to provide novel pharmaceutically active derivatives of imidazo[1,2-c]quinazolines having in the 5-position a substituent attached to this tricyclic compound by an oxygen atom. Another object is to provide novel 5-oxy-substituted-2,3-dihydroimidazo[1,2-c]quinazolines which are pharmaceutically active and especially as hypotensive agents or coronary dilators and pharmaceutical compositions incorporating said novel compounds. A further object is to provide new and useful processes and intermediates for preparation of said novel derivatives. Other objects and advantages will be apparent from the following description of the invention.

The novel derivatives of 2,3-dihydroimidazo[1,2-c] quinazolines of the invention may be represented structurally by the following Formula I:

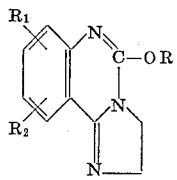

(I)

wherein:

R is lower alkyl, preferably of 1 to 5 carbon atoms, e.g., methyl; lower alkenyl, preferably of 1 to 5 carbon atoms, e.g., allyl; propargyl; di(lower of 1 to 4 carbon atoms)alkylamino(lower of 1 to 4 carbon atoms) alkyl, e.g., $$-CH_2CH_2N\begin{matrix}CH_3\\CH_3\end{matrix}$$

or

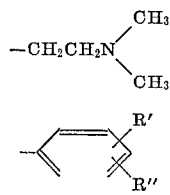

in which each of R' and R" represents independently hydrogen or halo of atomic weight of from 19 to 80; and
each of $R_1$ and $R_2$ is independently hydrogen, halo of atomic weight of from 19 to 80, lower alkyl, preferably of from 1 to 4 carbon atoms and lower alkoxy, preferably of from 1 to 4 carbon atoms.

A preferred method of preparation of compounds of Formula I involves the reaction of a 5-chloro-2,3-dihydroimidazo[1,2-c]quinazoline of Formula II

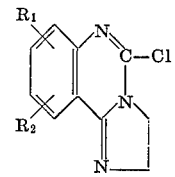

(II)

wherein $R_1$ and $R_2$ are as above-defined, with a compound of the Formula III $$M\text{---}O\text{---}R \qquad \text{(III)}$$

wherein R is as above-defined, and M represents a cation of a metal, preferably of an alkali metal such as sodium, potassium and lithium, more preferably sodium.

The production of compound I by reaction of a compound II with a compound III may be suitably carried out at temperatures in the range of 10° C. to 100° C., preferably 15° C. to 60° C. The reaction is conveniently carried out in an organic solvent which is nonhydroxylic and otherwise inert under the reaction conditions. Solvents which are of the conventional and well-known types are representative of the solvents which may be most conveniently employed. The suitable inert solvents include by definition herein the lower alcohols which represent the corresponding alcohol analogues of R in the compound of Formula III employed in the reaction. The more preferred organic solvents are those suited to well dissolving the reactants. The lower alcohols represent the solvents preferably employed when R is a nonaromatic hydrocarbon radical. In such situations the alcohol is the corresponding analogue of R and thus useful in forming the compound III, e.g., allyl alcohol when R is allyl and methanol when R is methyl. When R is aromatic or dialkylaminoalkyl, the more preferred solvents include dimethylacetamide, dimethylformamide and the like, more usually dimethylacetamide. The product compounds I may be obtained from the reaction by working up by established procedures.

The compounds of Formula III are of course well known or can be readily prepared from available materials by known procedures.

The compounds of Formula II are novel compounds which are preferably prepared by a two step reaction sequence involving in the first Step A the reaction of a 2,4-dichloroquinazoline of Formula IV

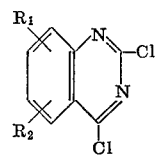

(IV)

wherein $R_1$ and $R_2$ are as above-defined, with ethylene imine (aziridine) of the Formula V

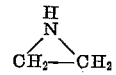

(V)

in an organic solvent to obtain a 2-chloro-4-ethyleniminoquinazoline of Formula VI:

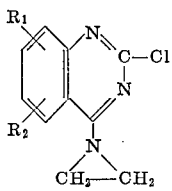

wherein $R_1$ and $R_2$ are as above-defined, said compound VI then being converted in a Step B to the corresponding compound of Formula II, preferably by reaction with a metal iodide in an inert solvent.

The preparation of compounds VI by the Step A reaction of a compound IV with a compound V is suitably carried out at temperatures in the range of 0° C. to 50° C., preferably 5° C. to 25° C. and at the lower range temperatures during the initial period. The reaction is desirably carried out in an inert solvent which may be any of the convenient well known nonhydroxylic organic solvents. The preferred solvents include those of both the aromatic and chlorinated hydrocarbon type, e.g., benzene and chloroform. An acid binding agent which may be any of the several well known types, preferably an alkali metal carbonate, e.g., potassium carbonate, is desirably employed in the reaction mixture. The product compounds of Formula VI, which are novel compounds, may be obtained from the reaction by working up by established procedures.

The preparation of compounds II from compounds VI by Step B is a rearrangement type reaction. The preferred method for preparation of compounds II involves the reaction of a compound VI with an alkali metal iodide, e.g., sodium iodide or potassium iodide, in an inert solvent medium. The reaction may be carried out at temperatures in the range of 10° C. to 100° C., preferably 15° C. to 50° C. The solvent for the reaction may be any of the convenient well known organic solvents which are nonhydroxylic and inert to the reaction. Examples of such inert solvents include acetone, dimethylacetamide, dimethylformamide, and dimethoxy ethane, preferably acetone. The compounds of Formula II may be obtained from the reaction by working up by established procedures.

The compounds of Formula II may be also produced in Step B by thermal rearrangement of compounds VI either in the presence or absence of a solvent and at temperatures in the range of at least 50° C. up to about 180° C., followed by working up and recovery by known procedures. The thermal rearrangement is preferably carried out in a solvent which is nonhydroxylic and inert, and which is conveniently a conventional organic solvent, e.g., dimethylformamide, dimethylacetamide, dichlorobenzene, xylene and the like, preferably dimethylformamide or dimethylacetamide.

The 2,4-dichloroquinazolines of Formula IV employed as starting material in Step A, above, are either known or may be prepared from known materials by procedures which are established and described in the literature, for example, by Curd et al., J. Chem. Soc., 1948, 1759 and by Hess et al., J. Med. Chem. 11, 130–136 (1968). In the prior art processes the 2,4-dichloroquinazolines are produced by first cyclizing an anthranilic acid or ester with an alkali metal cyanate, preferably in acetic acid and at temperatures of 80° C. to 120° C., to obtain the corresponding quinazoline-2,4-dione which is then converted to the desired 2,4-dichloroquinazoline by reaction with phosphorus oxychloride, preferably at temperatures between 80° C. to 120° C. In carrying out such processes to obtain the 2,4-dichloroquinazolines it was found particularly advantageous to employ the appropriate lower alkyl (1 or 2 carbon atoms) ester of the anthranilic acid in preference to anthranilic acid itself.

Also within the scope of the novel compounds provided by the invention are pharmaceutically acceptable salts not materially affecting the pharmacological effect of the compounds of Formulae I and II. Such salts include the acid addition salts, e.g., the hydrochloride, fumarate, formate, acetate, citrate, sulfonate, malonate, tartrate, methane sulfonate, salicylate and hydrosulfate. The acid addition salts may be produced as desired from the corresponding free bases by conventional procedures. Conversely the free bases may be obtained from the salts by procedures known in the art.

The compounds of structural Formula I and their pharmaceutically acceptable acid addition salts are useful because they possess pharmacological activity in animals. In particular, the compounds are useful as hypotensive agents, as indicated by a lowering of blood pressure on intravenous administration to the anesthetized dog (1–15 mg./kg. dosage). The compounds of the invention are also useful as coronary dilators, as indicated on intravenous administration to the anesthetized dog and measurement of blood flow through the anterior descending branch of the left coronary artery (1–15 mg./kg. dosage). For the above uses, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned uses, the dosage administered will, of course, vary depending upon the compounds used, the therapy desired and the mode of administration. However, in general, satisfactory results are obtained when administered at a daily dosage of from about .2 milligram to about 15 milligrams per kilogram of body weight, preferably given in divided doses 2 to 4 times a day, or in sustained release form. For most mammals the administration of from about 10 milligrams to about 100 milligrams of the compound per day provides satisfactory results and dosage forms suitable for internal administration comprise from about 3 milligrams to about 50 milligrams of the compound in admixture with a solid or liquid pharmaceutical carrier or diluent.

Of particular interest are the compounds of Formula I in which R is an acyclic unsaturated hydrocarbon radical and $R_1$ and $R_2$ represent 8,9-dimethoxy, especially 5-allyloxy-8,9-dimethoxy - 2,3 - dihydro-imidazo[1,2-c]quinazoline. In addition to being useful as coronary dilators, such compounds are also useful as nitrate potentiators as indicated in the above-indicated coronary dilation test employing 20 mcg./kg. of nitroglycerin administered intravenously following the compound of Formula I. Dosages and modes of administration with the appropriate compounds of Formula I as nitrate potentiators are similar to those indicated above for use as coronary dilators. As potentiators, the compounds of Formula I may be employed in conjunction with any of the well-known nitrate dilators, e.g., nitroglycerin and isosorbide dinitrate.

Among the preferred compounds of Formula I from an activity level standpoint are those in which $R_1$ and $R_2$ together represent 8,9-dimethoxy.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients.

| Ingredients: | Wt. (mg.) |
|---|---|
| 5-allyloxy-8,9-dimethoxy-2,3-dihydro-imidazo-[1,2-c]quinazoline | 25 |
| Tragacanth | 10 |
| Lactose | 197.5 |
| Corn starch | 25 |
| Talcum | 15 |
| Magnesium stearate | 2.5 |

Compounds of Formula II are also useful because of pharmacological activity in animals. More particularly, the compounds II are useful as analeptic agents as indicated by exhibiting hexobarbital antagonism when administered interperitoneally to the mouse at dosages of 5–50 mg. per kg. of body weight. Such compounds of Formula II may be employed in dosage forms and modes of administration similar to compounds of Formula I with satisfactory daily dosages generally being in the range of from 0.1 to 50 mg./kg. of body weight and with individual dosages for intravenous administration to large mammals being from 10 to 500 mg.

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

5-allyloxy-2,3-dihydro-imidazo[1,2-c]quinazoline

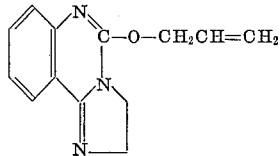

Step A: Preparation of 2-chloro-4-ethyleneimino-quinazoline.—To an ice cold suspension of 160 g. of 2,4-dichloroquinazoline and 65 g. of anhydrous potassium carbonate in 1.6 liters of absolute benzene is added 88 ml. of ethyleneimine. The resulting mixture was stirred for 30 minutes at 5–10° C. and then for 16 hours at room temperature. The resulting mixture was evaporated in vacuo to remove solvent, the crude residue taken up in methylene chloride, filtered to remove inorganic solids, and the organic phase then washed twice with 200 ml. of saturated sodium chloride solution, dried over anhydrous sodium sulfate, and evaporated in vacuo to obtain a residue which is crystallized from ethanol to obtain 2-chloro-4-ethylenimino-quinazoline, M.P. 117° C.

Step B: Preparation of 5-chloro-2,3-dihydro-imidazo[1,2-c]quinazoline.—To a solution of 135 g. of 2-chloro-4-ethylenimino-quinazoline in 2 liters of absolute acetone is added with stirring 13.5 g. of sodium iodide. There is then added 100 ml. of methylene chloride as co-solvent to obtain a clear solution and the resulting mixture stirred for 1 hour at room temperature. The mixture is evaporated to dryness, the residue dissolved in methylene chloride and this mixture washed three times with 200 ml. of saturated sodium chloride solution. The organic phase is dried over sodium sulfate, evaporated in vacuo and this residue crystallized from methylene chloride/acetone (1:1) to obtain 5-chloro-2,3-dihydro-imidazo[1,2 - c]quinazoline, M.P. 206–209° C.

Step C: Preparation of 5-allyloxy-2,3-dihydro-imidazo [1,2-c]quinazoline.—To a solution of sodium allyloxide prepared by dissolving 2.14 g. of sodium in 100 ml. of allyl alcohol is added 19 g. of 5-chloro-2,3-dihydro-imidazo[1,2-c]quinazoline. The resulting mixture is stirred overnight at room temperature, evaporated in vacuo to dryness, and the resulting residue treated with water to obtain a crystalline material which is recovered by filtering and recrystallized from ethylacetate to obtain 5-allyloxy-2,3-dihydro-imidazo[1,2 - c] equanazoline, M.P. 82–85° C.

EXAMPLE 2

5-(2,6-dichlorophenoxy)-2,3-dihydro-8,9-dimethoxy-imidazo[1,2-c]quinazoline

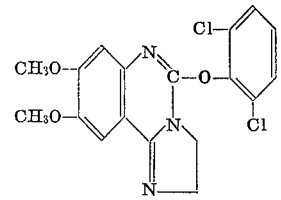

Step A: Preparation of 6,7-dimethoxy-quinazoline-2,4-dione.— To a suspension of 25 g. of methyl - 4,5-dimethoxyanthranilate in 50 ml. of acetic acid is added dropwise at room temperature a solution of 15 g. of potassium cyanate in 20 ml. of water. The resulting paste is stirred for one hour at room temperature, then treated by addition of 250 ml. of water and followed by the addition dropwise over a period of 30 minutes of 400 ml. of 50% sodium hydroxide solution. The resulting paste was heated with stirring at temperature of 90° C. for two hours, then cooled, filtered, and the resulting residue dissolve in warm water, treated with charcoal, filtered and made acidic to form a precipitate which is recovered by filtering. The precipitate is washed with water until neutral and then further washed with methanol and diethyl ether to obtain 6,7-dimethoxy-quinazoline-2,4-dione, M.P. 246° C.

Step B: Preparation of 2,4-dichloro-6,7-dimethoxy quinazoline.—To a suspension of 23 g. of 6,7-dimethoxy-quinazoline-2,4-dione in 100 ml. of phosphorus oxychloride is added 10 ml. of N,N-dimethylaniline. The resulting mixture is refluxed for 4 hours to obtain a clear red solution which is evaporated in vacuo to dryness to obtain a solid residue which is taken up in benzene and again evaporated in vacuo to dryness. The resulting residue is then taken up in 300 ml. of methylene chloride and 15 ml. of triethylamine and this solution filtered through Celite, extracted twice with 2 N sodium hydroxide solution, 3 times with water and finally with saturated sodium chloride solution. The organic phase is evaporated in vacuo to obtain a red solid which is recovered by filtering. The solid is washed with ether and recrystallized from petrol ether to obtain 2,4 - dichloro - 6,7 - dimethoxy quinazoline, M.P. 159–160° C.

Step C: Preparation of 2-chloro-4-ethylenimino-6,7-dimethoxy-quinazoline.—To a mixture of 52 g. of crude 2,4-dichloro-6,7-dimethoxy-quinazoline in 800 ml. of benzene and 200 ml. of chloroform is added 60 g. of potassium carbonate and then with stirring is also added 25 ml. of ethylene imine. A precipitate forms and after 6 hours an additional amount of 10 ml. of ethylene imine is added and the mixture then allowed to stand at room temperature overnight. The resulting mixture is evaporated in vacuo and the residue treated with methylene chloride followed by filtering to remove insoluble material. The filtrate is evaporated in vacuo to dryness to obtain a crude product which is 2-cholro-4-ethylenimino-6,7-dimethoxy-quinazoline which may be recrystallized from methylene chloride/diethyl ether to obtain a crystalline solid which has a varying M.P. due to rearrangement at elevated temperatures but melts at 192° C. when inserted at 170° C.

Step D: Preparation of 5-chloro-2,3-dihydro-8,9-dimethoxy-imidazo[1,2-c]quinazoline.—To a solution of 58 g. of 2-chloro-4-ethylenimino-6,7-dimethoxy-quinazoline in one liter of acetone is added 60 g. of sodium iodide. The resulting mixture is refluxed for 3 hours and evaporated in vacuo to dryness. The residue is treated with chloroform and insoluble material separated by filtering. The filtrate is passed through 400 g. of aluminum oxide and the resulting solution evaporated to dryness. The resulting residue is then crystallized from ethylene chloride to obtain 5-chloro-2,3-dihydro-8,9-dimethoxy-imidazo[1,2 - c] quinazoline, M.P. 185–187° C.

Step E: Preparation of 5-(2,6-dichlorophenoxy)-2,3-dihydro-8,9-dimethoxy-imidazo[1,2-c]quinazoline.—A solution of 10.5 g. of 5-chloro-2,3-dihydro-8,9-dimethoxy-imidazo[1,2-c]quinazoline in 40 ml. of dimethylacetamide is added to the mixture formed after cessation of hydrogen evolution by the mixing of 6.5 g. of 2,6-dichlorophenol in 60 ml. of dimethylacetamide with 1.8 g. of sodium hydride (57% in mineral oil). The resulting mixture is heated for 16 hours at temperature of 70° C. and then treated by addition of water to obtain a milky solution which is extracted twice with methylene chloride, followed by extraction of the organic phase once with 2 N sodium hydroxide solution and twice with water. The organic phase is then dried over sodium sulphate and evaporated in vacuo to obtain a residue which is crystallized from methylene chloride/diethyl ether (1:2) to obtain 5-(2,6-dichlorophenoxy)-2,3-dihydro-8,9 - dimethoxy quinazoline having an M.P. of 284–287° C. when inserted at 282° C.

EXAMPLE 3

5-(2-dimethylaminoethoxy)-2,3-dihydro-imidazo [1,2-c]quinazoline

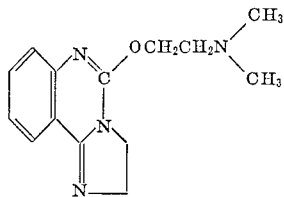

To the reaction product of 2.14 g. of sodium and 250 ml. of dimethylaminoethanol is added 19.0 g. of 5-chloro-2,3-dihydro-imidazo[1,2-c]quinazoline dissolved in 100 ml. of dimethylacetamide. The mixture is stirred for 30 hours at room temperature and evaporated in vacuo to dryness at 70° C. The residue is dissolved in methylene chloride, washed with water, dried and evaporated in vacuo to remove solvent. The residue is taken up in diethyl ether and the resulting mixture filtered to remove precipitated matter. The filtrate is concentrated in vacuo to obtain crystals of 5-(2-dimethylaminoethoxy)-2,3-dihydro-imidazo[1,2-c]quinazoline, M.P. 73–75° C.

EXAMPLE 4

5-allyloxy-8,9-dimethoxy-2,3-dihydro-imidazo [1,2-c]quinazoline

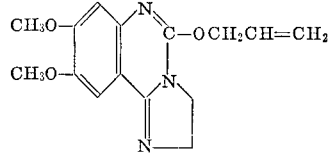

The sodium salt of allyl alcohol is prepared by dissolving 0.53 mg. of sodium in 25 ml. allyl alcohol in a nitrogen atmosphere. To this mixture a solution of 6 g. of 5-chloro-2,3-dihydro-8,9-dimethoxy - imidazo[1,2-c]quinazoline in 80 ml. allyl alcohol is added, the resulting solution stirred at room temperature overnight, and then evaporated in vacuo to dryness. Water is added to the residue and the crystalline precipitate thus obtained is filtered off, dissolved in methylene chloride, washed with water, dried over sodium sulfate and the solvent replaced by adding ethanol and evaporating at atmospheric pressure to selectively remove the methylene chloride. On continuing evaporation of the resulting ethanol solution there is obtained 5-allyloxy-8,9-dimethoxy-2,3-dihydro-imidazo[1,2-c]quinazoline, M.P. 195–196° C.

EXAMPLE 5

2,3-dihydro-5,8,9-trimethoxy-imidazo[1,2-c] quinazoline

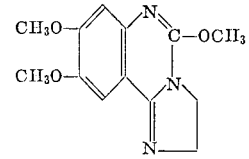

To a solution of sodium methoxide in methanol (130 mg. of sodium in 10 ml. of methanol) is added a solution of 1.45 g. of 5-chloro-2,3-dihydro-8,9-dimethoxy-imidazo [1,2-c]quinazoline in 20 ml. of methanol. The mixture is stirred for 90 minutes at room temperature and then treated by addition of water to form a precipitate which is taken up in ethyl acetate, dried and evaporated in vacuo to obtain on recrystallization from ethyl acetate crystals of 2,3 - dihydro - 5,8,9 - trimethoxy-imidazo[1,2-c]quinazoline, M.P. 203–204° C.

EXAMPLE 6

Following the procedure of the preceding examples and employing equivalent amounts and the appropriate compound of Formula III, i.e. M—O—R as defined above, the following product of the invention is obtained:

(a) 8,9 - dimethoxy - 5 - propargyloxy - 2,3-dihydro-imidazo[1,2-c]quinazoline, M.P. 215–217° C. (crystallization from ethanol).

What is claimed is:
1. A compound of the formula:

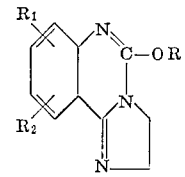

wherein
R is lower alkyl, lower alkenyl, propargyl, di(lower) alkylamino(lower)alkyl, or

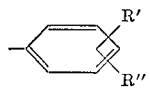

in which each of R' and R" is independently hydrogen or halo selected from the group consisting of fluoro, chloro and bromo; and
each of $R_1$ and $R_2$ is independently hydrogen, halo selected from the group consisting of fluoro, chloro and bromo, lower alkyl, or lower alkoxy; provided that each of $R_1$ and $R_2$ is lower alkoxy when R is lower alkyl; and pharmaceutically acceptable acid addition salts thereof.

2. A compound of claim 1 in which $R_1$ is 8-methoxy and $R_2$ is 9-methoxy.

3. A compound of claim 1 in which R is lower alkenyl.

4. A compound of claim 3 in which R is allyl.

5. The compound of claim 4 in which $R_1$ is 8-methoxy and $R_2$ is 9-methoxy.

6. A compound of claim 1 in which R is dialkylaminoalkyl.

7. A compound of claim 6 in which R is dimethylaminoethyl.

8. The compound of claim 7 in which R is methyl and in which $R_1$ is 8-methoxy and $R_2$ is 9-methoxy.

9. A compound of claim 1 in which R is propargyl.

10. The compound of claim 9 in which $R_1$ is 8-methoxy and $R_2$ is 9-methoxy.

11. A compound of claim 1 in which R is

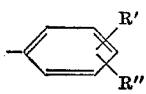

12. A compound of claim 11 in which each of R' and R'' is chloro.

13. A compound of claim 11 in which $R_1$ is 8-methoxy and $R_2$ is 9-methoxy.

14. A compound of claim 12 in which $R_1$ is 8-methoxy and $R_2$ is 9-methoxy.

15. A compound of claim 1 in which each of $R_1$ and $R_2$ is lower alkoxy.

16. A compound of claim 15 in which R is lower alkyl.

References Cited

Grout et al., Chem. Abstracts, vol. 55, col. 2668 (1961)

Wagner et al., Synthetic Organic Chemistry, John Wiley, New York, 1953, pp. 226–8.

ALEX MAZEL Primary Examiner

R. J. GALLAGHER Assistant Examiner

U.S. Cl. X.R.

260—256.5; 424—251